US008665371B2

(12) United States Patent
Kim et al.

(10) Patent No.: US 8,665,371 B2
(45) Date of Patent: *Mar. 4, 2014

(54) TELEVISION CONTROL METHOD

(75) Inventors: Jung-dae Kim, Seoul (KR); Yong-hwan Kwon, Seongnam-si (KR); Sun-hwa Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 13/354,958

(22) Filed: Jan. 20, 2012

(65) Prior Publication Data

US 2012/0113325 A1    May 10, 2012

Related U.S. Application Data

(63) Continuation of application No. 11/357,182, filed on Feb. 21, 2006, now Pat. No. 8,120,708.

(30) Foreign Application Priority Data

Apr. 18, 2005 (KR) ........................ 10-2005-0032000

(51) Int. Cl.
*H04N 5/50* (2006.01)
(52) U.S. Cl.
USPC ........... 348/570; 348/569; 348/564; 348/731; 725/37
(58) Field of Classification Search
USPC .............. 348/731–733, 553–570; 725/27–52; 715/716–719
See application file for complete search history.

(56) References Cited

U.S. PATENT DOCUMENTS

| 5,194,954 | A | 3/1993 | Duffield |
| 5,926,207 | A | 7/1999 | Vaughan et al. |
| 6,817,027 | B1 | 11/2004 | Curreri |
| 6,904,610 | B1 | 6/2005 | Bayrakeri et al. |
| 7,212,249 | B1 | 5/2007 | Casement |
| 2002/0095673 | A1 | 7/2002 | Leung et al. |

FOREIGN PATENT DOCUMENTS

| CN | 1057747 A | 1/1992 |
| CN | 1416274 A | 5/2003 |
| CN | 1497958 A | 5/2004 |
| CN | 1533173 | 9/2004 |
| CN | 1533173 A | 9/2004 |
| JP | 2001-313878 A | 11/2001 |
| JP | 2004032624 A | 1/2004 |
| JP | 2004-194250 A | 7/2004 |
| KR | 1999-0066515 A | 8/1999 |
| KR | 2003-0067848 A | 6/2003 |
| KR | 10-2004-0011733 A | 2/2004 |
| KR | 2004-0093239 A | 11/2004 |

*Primary Examiner* — Michael Lee
(74) *Attorney, Agent, or Firm* — Sughrue Mion, PLLC

(57) ABSTRACT

A method is provided for controlling a television including a user input part for manipulating a channel adjusting item. The method includes displaying a channel map showing a predetermined number of channels including a tuned broadcast channel if the channel adjusting item is selected through the user input part, and a channel setting information menu corresponding to one of the channels shown in the channel map. Thus, the television control method not only allows a user to easily and simply recognize a channel setting state according to channels when the user wants to adjust channel-related functions, but also allows a user to conveniently and effectively adjust the channel setting state according to the channels.

11 Claims, 6 Drawing Sheets

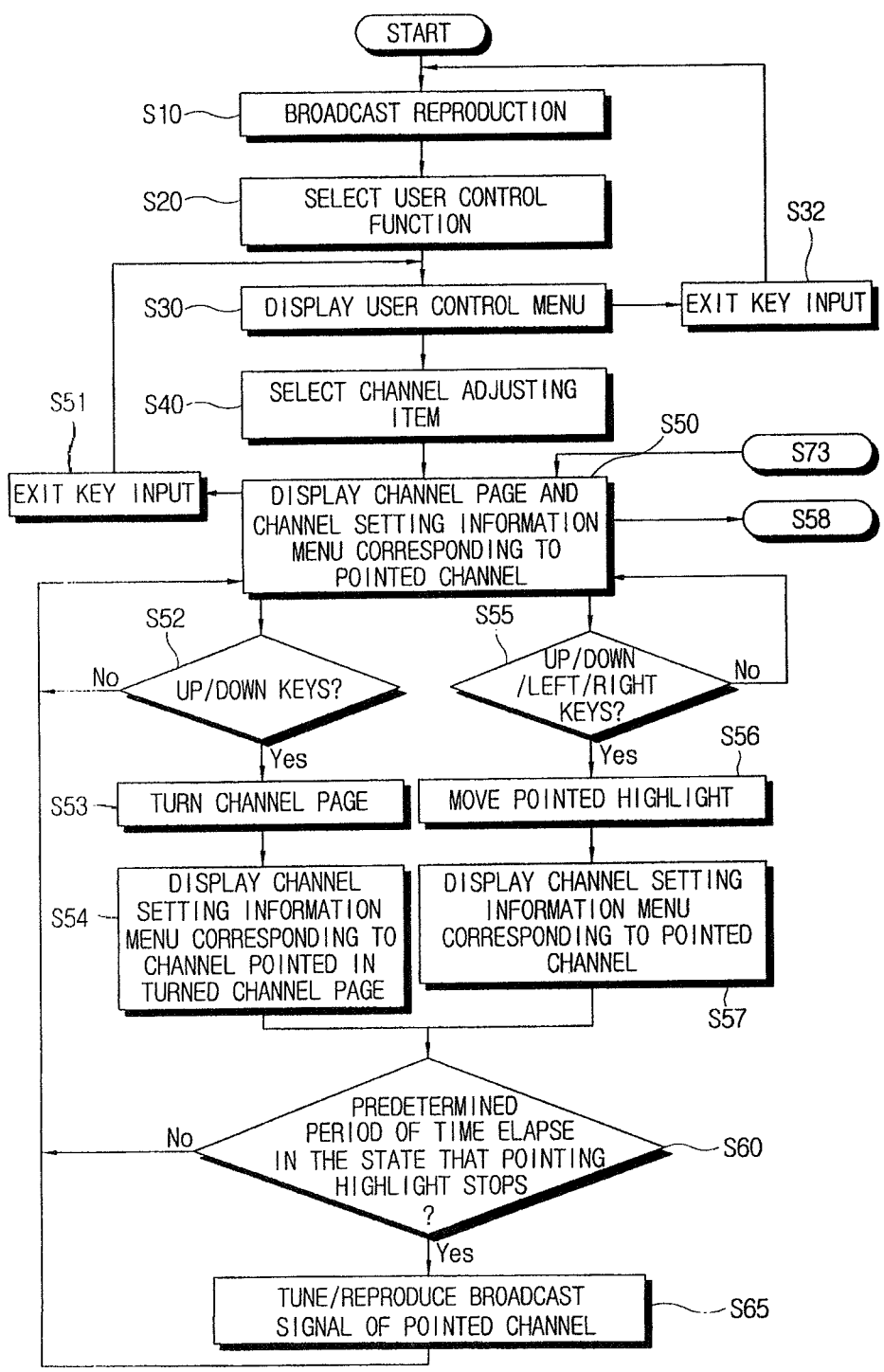

TELEVISION CONTROL METHOD

CROSS-REFERENCE TO RELATED APPLICATIONS

This is a Continuation of application Ser. No. 11/357,182 filed Feb. 21, 2006, which claims priority from Korean Patent Application No. 2005-0032000, filed Apr. 18, 2005, in the Korean Intellectual Property Office, the disclosure of which is incorporated herein by reference.

BACKGROUND OF THE INVENTION

1. Field of the Invention

The present invention relates to a television control method, and more particularly, to a television control method which not only allows a user to easily and simply recognize a channel setting state according to channels when the user wants to adjust channel-related functions, but also allows the user to conveniently and effectively adjust the channel setting state according to the channels.

2. Description of the Related Art

In general, a television includes an antenna to receive broadcast signals, a tuner to select a predetermined signal among the received broadcast signals, a signal processor to process the tuned broadcast signal, a display part to display a picture based on the processed broadcast signal, and a microcomputer to control the tuner, the signal processor and the display part.

Such a television displays a user control menu as an on screen display (OSD), in which the user control menu includes various items for allowing a user to adjust a state of the television. Thus, a user can adjust the state of the television through the user control menu.

Recently, as digital technology has rapidly developed, market penetration of digital television has increased. Compared with an analog television, the number of adjustable functions in digital television is being exponentially increased. In other words, the digital television provides a user an opportunity to adjust various functions as developed in the digital technology.

However, too many functions of the digital television can be counterproductive. That is, a user may be confused by many and complicated functions rather than effectively using various functions. Particularly, a user is likely to be confused at channel-related functions that are considered a very important function of the digital television.

In a conventional digital television, in order to adjust the channel-related functions, a user selects a channel adjusting item in a user control menu, and selects a desired one among various channel-related items displayed as sub-menus of the channel adjusting item. Thus, a user selects the channels to be adjusted in a setting state corresponding to the selected channel-related item, and then adjusts the setting states of the respective channels one by one. Therefore, when the user wants to adjust the channel-related functions, the conventional digital television is inconvenient because the user should select/adjust the respective channels according to the channel-related items one by one. Further, a user may become confused when trying to recognize the setting states of the channel-related functions corresponding to the respective channels.

SUMMARY OF THE INVENTION

It is an aspect of the present invention to provide a television control method which not only allows a user to easily and simply recognize a channel setting state according to channels when the user wants to adjust channel-related functions, but also allows the user to conveniently and effectively adjust the channel setting state according to the channels.

According to an aspect of the present invention, there is provided a method of controlling a television comprising a user input part for manipulating a channel adjusting item, the method comprising displaying a channel map showing a predetermined number of channels including a tuned broadcast channel when the channel adjusting item is selected through the user input part, and a channel setting information menu corresponding to one of the channels shown in the channel map.

According to an aspect of the present invention, the method further comprises selecting a user control function through the user input part; displaying a user control menu including the channel adjusting item when the user control function is selected; and selecting the channel adjusting item in the user control menu.

According to an aspect of the present invention, the displaying the channel map and the channel setting information menu comprises displaying the channel setting information menu corresponding to the channel pointed by a pointing highlight on the channel map.

According to an aspect of the present invention, the channel map is displayed by dividing total channels into a plurality of channel pages including the predetermined number of channels, and the displaying the channel map and the channel setting information menu comprises displaying the channel page including the tuned broadcast channel in the channel map while pointing the tuned broadcast channel when the channel adjusting item is selected in the user control menu.

According to an aspect of the present invention, the channel map and the channel setting information menu are displayed on a channel adjusting menu at the same time.

According to an aspect of the present invention, the user input part comprises up/down/left/right keys to move the pointing highlight for pointing the channel on the channel map, and channel switching up/down keys to switch the channel page, and the pointing highlight moves on the channel map as the up/down/left/right keys are manipulated, and the channel page is turned as the channel switching up/down keys are manipulated.

According to an aspect of the present invention, the method further comprises determining whether a predetermined period of time elapses in the state that the pointing highlight stops at a predetermined channel in the case where the pointing highlight is moved on the channel map as the user input part is manipulated; and tuning the television to the channel pointed by the pointing highlight when the predetermined period of time elapses in the state that the pointing highlight stops.

According to an aspect of the present invention, the channel setting information menu comprises: a channel name item to adjust a name of the channel; a channel add/erase item showing an add/erase state of the channel and adding/erasing the channel; a preference channel item showing whether the channel is set as a preference channel and setting the channel as the preference channel; a low noise amplifier item showing whether receive sensitivity is improved and setting the receive sensitivity; and a channel lock item showing whether a channel is locked and setting a channel lock function.

According to an aspect of the present invention, the user input part comprises a selection key to select a pointed item, the method further comprising: adjusting a channel setting state of a pointed channel through the channel setting information menu corresponding to the channel pointed when the selection key is selected on the channel map.

According to an aspect of the present invention, the adjusting the channel setting state of the pointed channel comprises displaying the pointing highlight on the channel setting information menu corresponding to the channel pointed when the selection key is manipulated; pointing a predetermined item by moving the pointing highlight on the channel setting information menu as the user input part is manipulated; and adjusting the channel setting state corresponding to the item pointed by the pointing highlight on the channel setting information menu as the user input part is manipulated.

BRIEF DESCRIPTION OF THE DRAWINGS

The above and/or other aspects of the present invention will become apparent and more readily appreciated from the following description of the exemplary embodiments, taken in conjunction with the accompany drawings of which:

FIGS. 2A and 2B are flowcharts of a television control method according to an exemplary embodiment of the present invention;

DETAILED DESCRIPTION OF THE EXEMPLARY EMBODIMENT

Figure 1:
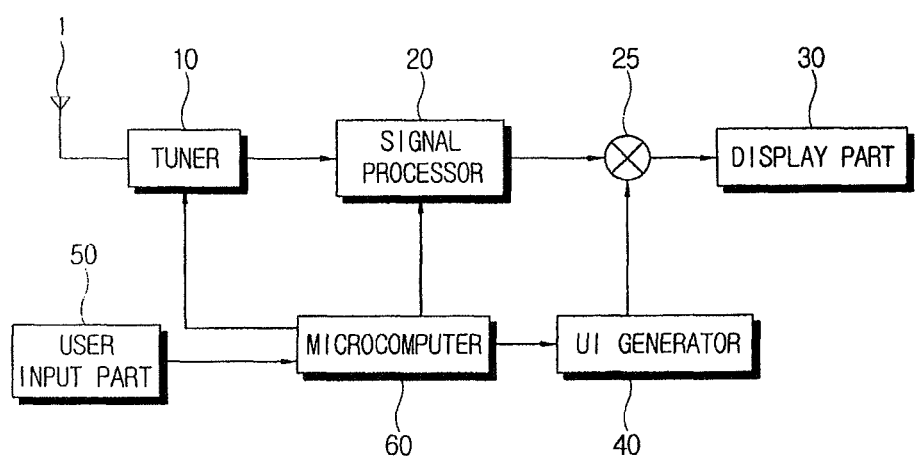
FIG. 1 is a control block diagram of a television according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

As shown in FIG. 1, a television according to an exemplary embodiment of the present invention includes an antenna 1, a tuner 10, a signal processor 20, a mixer 25, a display part 30, a user input part 50, a user interface (UI) generator 40, and a microcomputer 60. According to an exemplary embodiment of the present invention, a control method for digital television will be described by way of example, but the present invention is not limited thereto. Alternatively, the control method according to an exemplary embodiment of the present invention may be applied to an analog television.

The antenna 1 is used for receiving broadcast signals, e.g., receiving a digital broadcast signal.

The tuner 10 is controlled by the microcomputer 60 to receive the digital broadcast signals from the antenna 1, and select the broadcast signal of a predetermined channel switched through the user input part 50.

The signal processor 20 processes the broadcast signal output from the tuner 10 to be reproduced. For reference, the signal processor 20 may include a channel decoder (not shown) to demodulate an intermediate frequency broadcast signal of the digital broadcast signal tuned in the tuner 10 into a predetermined transport stream, a transport stream decoder (not shown) to decode program information corresponding to the channel switched by a user and a predetermined video signal stream of the transport stream output from the channel decoder, and a video decoder (not shown) to receive and extract the video signal stream output from the transport stream decoder so as to restore the video signal stream into an original video signal by extraction.

The mixer 25 processes the video signals to be displayed on the display part 30, thereby displaying a picture based on the video signal reproducibly processed by and output from the signal processor 20 to be overlapped with a menu picture based on a UI menu signal outputted from the UI generator 40.

The display part 30 displays a picture based on the video signal output from the mixer 25. For reference, the display part 30 may include a display panel (not shown) on which a picture is displayed, and a panel driver (not shown) to drive the display panel to display a picture based on the video signal output from the mixer 25.

The user input part 50 outputs a key signal to the microcomputer 60 according to manipulations of a user. Here, the user input part 50 may include a menu key (not shown) allowing a user to select a user control function; up/down/right/left keys (not shown) provided in the front of a television; channel switching up/down keys (not shown), an enter key (not shown), an exit key (not shown), and a key signal generator (not shown) to generate the key signals according to key manipulations.

Alternatively, the user input part 50 may be achieved by a separate input unit such as a mouse (not shown), a keyboard (not shown), or a remote controller (not shown). When a user manipulates the key, the key signal generator generates the key signal corresponding to the key manipulation, thereby transmitting the key signal to the microcomputer 60. Thus, the microcomputer 60 controls the signal processor 20, the UI generator 40, the tuner 10 and the like in correspondence to the key signal output from the key signal generator.

The UI generator 40 generates a user control menu containing various adjusting items for allowing a user to adjust a state of the television, and sub-menus corresponding to the respective adjusting items on the basis of the controls of the microcomputer 60, in which the user control menu and the sub-menus are displayed on the display part 30. Further, the UI menu signals corresponding to the user control menu and its sub-menus generated by the UI generator 40 are mixed with the video signal output from the signal processor 20, and displayed on the display part 30. Here, the UI generator 40 may be achieved by an OSD generator to generate an OSD.

When the channel adjusting item for adjusting channel-related functions is selected in the user control menu, the UI generator 40 generates a channel map showing a predetermined number of channels including a tuned broadcast channel, and a channel setting information menu corresponding to the channel pointed by a pointing highlight on the channel map.

Figure 3:
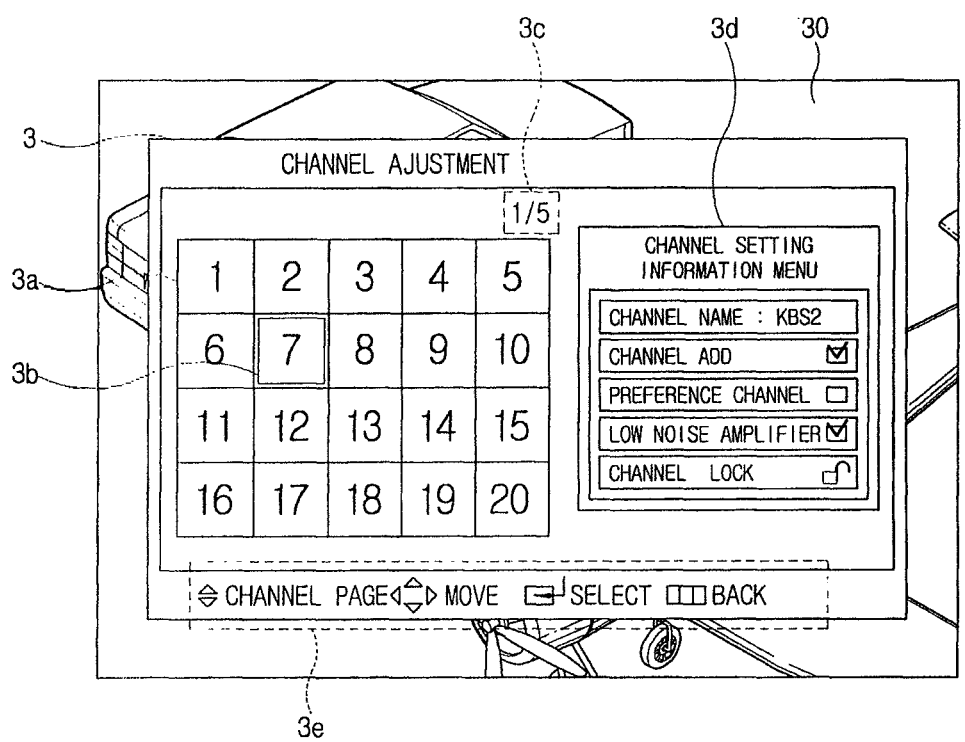
FIG. 3 shows an interface including a channel map and a channel setting information menu displayed on the television according to an exemplary embodiment of the present invention.

As shown in FIG. 3, when the menu key is manipulated while the display part 30 displays a picture based on the broadcast signal, e.g., while the television displays a picture corresponding to a channel number of "7", the UI generator 40 displays the user control menu according to the controls of the microcomputer 60. At this time, when the channel adjusting item is selected in the user control menu, the UI generator 40 is controlled by the microcomputer 60 to display a channel adjusting menu 3 having a channel map 3a corresponding to a channel page containing the tuned channel "7" pointed by a pointing highlight 3b, and a channel setting information menu 3d corresponding to the channel pointed by the pointing highlight 3b. Preferably, but not necessarily, the microcomputer 60 stores preset channel setting states of the respective channels, and thus the UI generator 40 receives the channel setting states of a desired channel from the microcomputer 60 and generates it as the channel setting information menu 3*d*.

The channel map is displayed by dividing a total number of channels into a plurality of channel pages each including a predetermined number of channels. According to an exemplary embodiment of the present invention, the channel map has 5 channel pages, and each channel page includes 20 channels, i.e., the number of total channels is 100. In FIG. 3, the channel map 3*a* shows the first channel page among five channel pages. Further, page information 3*c* lets a user know what channel page is displayed among the total channel pages. For example, "1/5" indicates the first channel page among a total of five channel pages.

Further, the UI generator 40 moves the pointing highlight 3*b* up, down, left and right according to the controls of the microcomputer 60 based on the input of the user input part 50, and is controlled by the microcomputer 60 to display the channel page to be turned.

Here, the channel setting information menu 3*d* includes various setting information showing the channel setting states about the channel "7" pointed in the channel map 3*a*. That is, the channel setting information menu 3*a* contains a channel name item to adjust names of channels; a channel add/erase item showing an add or erase state of a channel and adding and/or erasing a channel; a preference channel item showing whether a channel is set as a preference channel and setting a channel as the preference channel; a low noise amplifier (LNA) item showing whether receive sensitivity is improved and setting the received sensitivity; and a channel lock item showing whether a channel is locked and setting a channel lock function.

Thus, when the channel adjusting function is selected, the television control method according to an exemplary embodiment of the present invention shows the channel setting information corresponding to each channel as moving the pointing highlight 3*b* on the channels, and effectively shows the channels by dividing a large number of total channels into predetermined channel pages.

The microcomputer 60 controls the user control menu to be displayed when the user control function is selected by the menu key of the user input part 50, and controls the UI generator 40 to display the channel adjusting menu 3 when the channel adjusting item is selected for adjusting the channel-related function in the user control menu. Further, the microcomputer 60 controls the UI generator 40 to move the pointing highlight 3*b* on the channels in the channel map as the up/down/left/right keys are manipulated through the user input part 50. Also, the microcomputer 60 controls the UI generator 40 to turn the channel page in the channel map as the channel switching up/down keys are manipulated through the user input part 50.

Further, while the channel pointed by the pointing highlight 3*b* is switched as the pointing highlight 3*b* moves on the channels or the channel page is turned through the user input part 50, the microcomputer 60 determines whether a predetermined period of time elapses in the state that the pointing highlight 3*b* points a predetermined channel. That is, the microcomputer 60 determines whether the pointing highlight 3*b* is stopped at a certain channel for more than a predetermined period of time. When the pointing highlight 3*b* is stopped at a certain channel for more than a predetermined period of time, the microcomputer 60 controls the tuner 10 and the signal processor 20 to display a picture corresponding to the pointed channel. Thus, in the television control method according to an exemplary embodiment of the present invention, a picture corresponding to a channel pointed by the pointing highlight 3*b* is displayed not when the pointing highlight 3*b* moves on the channels quickly, but when the pointing highlight 3*b* is stopped at a certain channel for more than a predetermined period of time. Therefore, a quick channel scan is possible.

Below, exemplary embodiments in which the channel page is turned and the pointed channel changed corresponding to the turned channel page is adjusted in the channel setting state will be described with reference to FIGS. 4 and 5.

Figure 4:
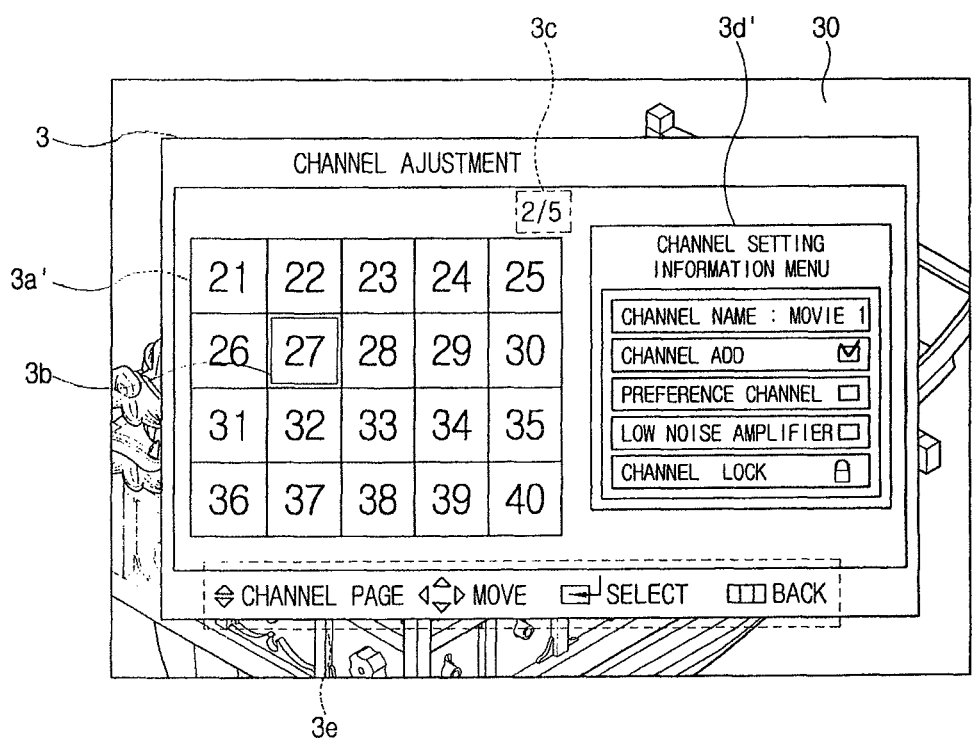
FIG. 4 shows a turned channel page in the channel map of FIG. 3.

When the channel switching down key of the user input part 50 is manipulated, the microcomputer 60 controls the UI generator 40 to turn the channel page, thereby displaying a channel map 3*a'* corresponding to the second channel page and a changed page information 3*c* of "2/5" as shown in FIG. 4. At this time, the UI generator 40 maintains the position pointed by the pointing highlight 3*b*, so that the pointing highlight 3*b* points a channel "27". Further, the UI generator 40 displays a channel setting information 3*d'* about the pointed channel "27". Here, the channel setting information about the channel "27" shows that the channel "27" has a channel name of "movie 1"; the channel add item is set; a preference channel item is not set; the low noise amplifier is not set; and the channel lock is set.

Figure 5:
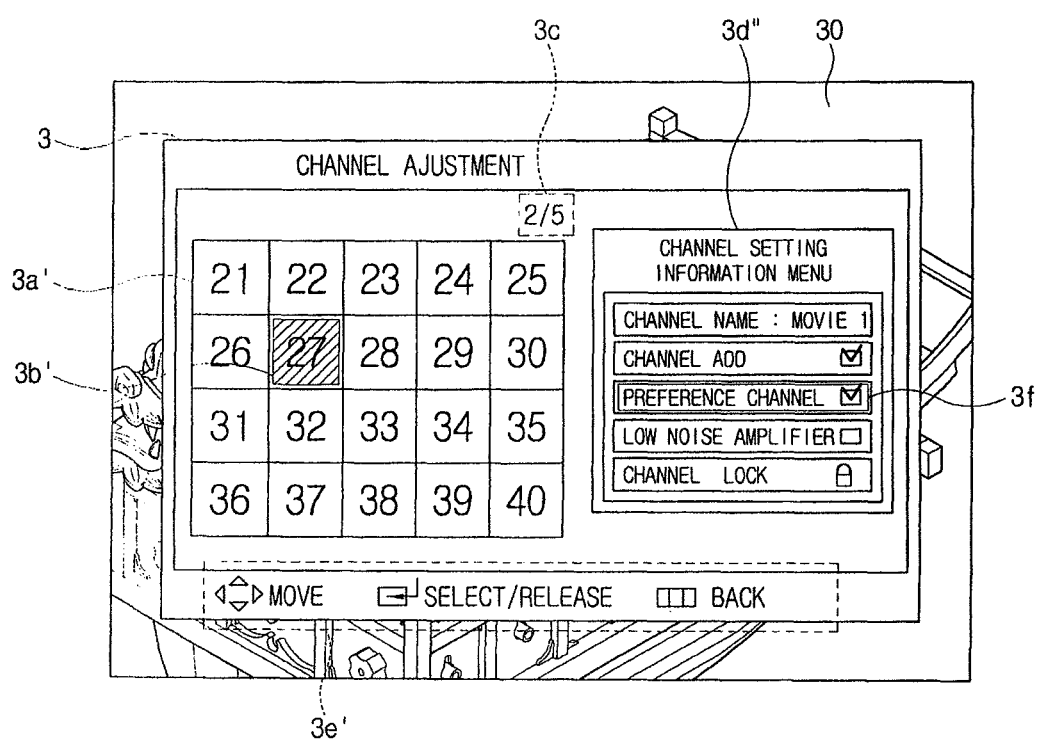
FIG. 5 shows that a channel setting state is controlled through the channel setting information menu of FIG. 4.

When the enter key of the user input part 50 is manipulated in the state of FIG. 4, the microcomputer 60 controls the UI generator 40 to display a highlight 3*b'* informing a user that a channel "27" is selected as shown in FIG. 5. Further, the UI generator 40 displays the channel setting information menu 3*d'* of FIG. 4 to be pointed by a pointing highlight 3*f,* and changes it into a channel setting information menu 3*d"* of FIG. 5 which can allow a user to set the channel setting state.

Here, the UI generator 40 is controlled by the microcomputer 60 to move the pointing highlight 3*f* on the channel setting information menu 3*d"* as the up, down, left and right keys are manipulated through the user input part 50.

As an example of adjusting the channel setting states of the channel "27" selected by the highlight 3*d'* through the channel setting information menu 3*d"*, a process of setting the channel "27" as the preference channel will be described with reference to FIG. 5. The UI generator 40 is controlled by the microcomputer 60 to make the pointing highlight 3*f* on the channel setting information menu 3*d"* point the reference channel item as the left/right keys or the up/down keys are manipulated through the user input part 50. For example, when the enter key is selected in the state that the pointing highlight 3*f* points the preference channel item showing that the channel "27" is not set as the preference channel, the UI generator 40 displays that the channel "27" is set as the preference channel, and the microcomputer 60 stores information that the channel "27" is set as the preference channel. In the processes of adjusting the channel setting states of the channel "27", the same or similar methods of adjusting the preference channel item can be applied to the channel name item, the channel add/erase item, the low noise amplifier item and the channel lock item.

Thus, when the channel adjusting function is selected, the television control method according to an exemplary embodiment of the present invention shows the channel setting information corresponding to each channel pointed by the pointing highlight 3*b*, and allows a user to effectively adjust the channel setting states of the respective channels in the channel setting information menu.

Figure 2B:
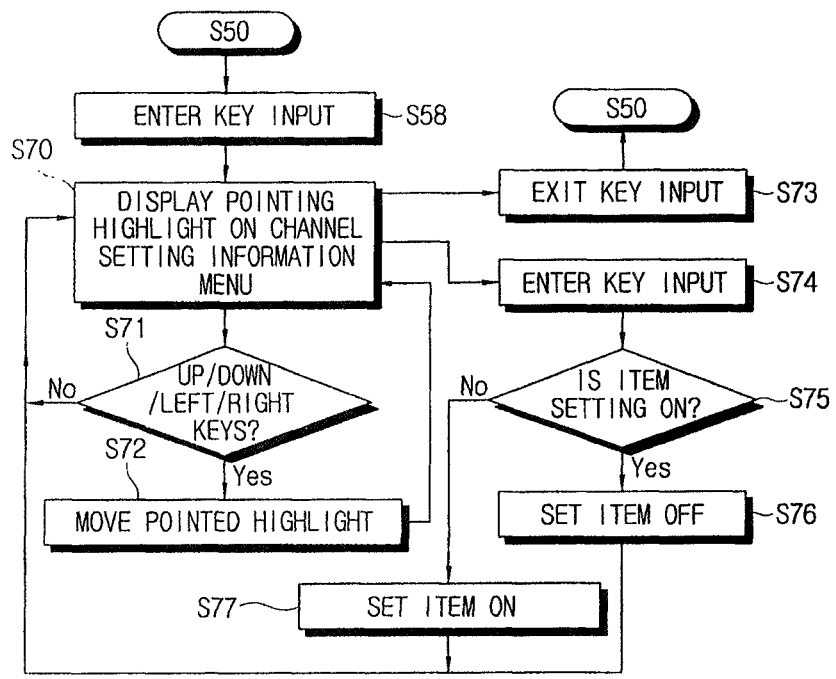

Below, the television control method according to an exemplary embodiment of the present invention will be described with reference to FIGS. 2A and 2B.

At operation S10, the television reproduces a broadcast signal corresponding to a channel selected by a user. At operation S20, a user selects the user control function by manipulated the menu key. At operation S30, the UI generator 40 generates the user control menu. At operation S40, a user selects the channel adjusting item in the user control menu by manipulating the user input part 50. At operation S50, the UI generator 40 highlights the tuned channel, e.g., the channel "7" in the channel map 3a corresponding to the channel page including the channel "7" and displays the channel setting information menu 3d showing the channel setting states corresponding to the highlighted channel (refer to FIG. 3). Here, when the exit key is manipulated in the operation of S32, the UI generator 40 stops displaying the user control menu, and thus the television reproduces the broadcast signal corresponding to the channel selected by a user.

In the operation S50 displaying the channel map 3a and the channel setting information menu 3d, when the channel switching up/down keys of the user input part 50 are manipulated at operation S52, the UI generator 40 turns and displays the channel page of the channel map at operation S53. For example, when the down key is manipulated in the state of FIG. 3 (the first channel page), the UI generator 40 turns the channel page, thereby displaying the channel map 3a' corresponding to the second channel page as shown in FIG. 4. At operation S54, the UI generator 40 displays the channel setting information menu of the channel pointed by the pointing highlight 3b in the channel map corresponding to the turned channel page as the channel switching up/down keys are manipulated. Further, in the operation of S50, when the up/down keys or the left/right keys are manipulated through the user input part 50 at operation S55, the UI generator 40 moves the pointing highlight 3b up/down or left/right on the channel map 3a at operation S56. Thus, at operation S57, the UI generator 40 displays the channel setting information menu corresponding to the channel pointed by the pointing highlight 3b as the up/down keys or the left/right keys are manipulated. Also, in the operation of S50, when the exit key is manipulated at operation S51, the UI generator 40 displays a previous menu, i.e., the user control menu S30. Preferably, but not necessarily, the microcomputer 60 stores information about the preset channel setting states of the respective channels, and thus the UI generator 40 receives the information about the channel setting states of a desired channel from the microcomputer 60 and generates it as the channel setting information menu.

While the operations S50 through S57 for displaying and manipulating the channel map 3a and the channel setting information menu are implemented, i.e., while the channel pointed by the pointing highlight 3b is switched as the pointing highlight 3b moves corresponding to manipulation of the up/down/left/right keys or as the channel page is turned corresponding to manipulation the channel switching up/down key, at operation S60, the microcomputer 60 determines whether a predetermined period of time elapses in the state that the pointing highlight 3b points a predetermined channel. That is, at operation S60, the microcomputer 60 determines whether the pointing highlight 3b is stopped at a certain channel for more than a predetermined period of time. When the pointing highlight 3b is stopped at a certain channel for more than a predetermined period of time, at operation S65, the microcomputer 60 controls the tuner 10 and the signal processor 20 to reproduce the broadcast signal corresponding to the pointed channel.

Here, when the enter key is manipulated through the user input part 50 in the operation S50, i.e., in the state that the channel "27" is pointed as shown in FIG. 4, the UI generator 40 displays the channel map 3a' including the highlight 3b' informing a user that the channel "27" is selected as shown in FIG. 5. Further, at operation S70, the UI generator 40 displays the channel setting information menu 3d' of FIG. 4 to be pointed by the pointing highlight 3f, and changes it into the channel setting information menu 3d" of FIG. 5 which can allow a user to set the channel setting state. Here, when the up, down, left and right keys are manipulated at operation S71, the UI generator 40 moves the pointing highlight 3f on the channel setting information menu 3d" at operation S72. Further, in the operation S70, when the exit key is manipulated at operation S73, the UI generator 40 displays the previous menu. That is, in the operation S70, when the exit key is manipulated at operation S73, the UI generator 40 changes the channel setting information menu 3d" into the channel setting information menu 3d' on which the pointing highlight 3f is not displayed, and changes the channel map 3a' of FIG. 4 having the highlight 3b' into the channel map 3a' of FIG. 5 having the pointing highlight 3b at operation S50.

In the operation S70, when the enter key of the user input part 50 is manipulated at operation S74, i.e., when the enter key is selected in the state that the preference channel item for the channel "27" is pointed by the pointing highlight 3f as shown in FIG. 5 at operation S74, the UI generator 40 determines whether the current channel is set as the preference channel at operation S75. When it is determined that the channel "27" is not set as the preference channel as shown in FIG. 4, the UI generator 40 displays that the channel "27" is set as the preference channel as shown in FIG. 5 at operation S77, and thus the microcomputer 60 stores information that the channel "27" is set as the preference channel. On the other hand, in the operation S75, when it is determined that the channel "27" is set as the preference channel, the UI generator 40 displays that the channel "27" is not set as the preference channel at operation S76, and thus the microcomputer 60 stores information that the channel "27" is not set as the preference channel.

Thus, when the channel adjusting function is selected, the television control method according to an exemplary embodiment of the present invention shows the channel setting information corresponding to each channel pointed by moving the pointing highlight on the channels, and effectively shows the channels by dividing the total number of channels into predetermined channel pages. Further, the television control method according to an exemplary embodiment of the present invention allows a user to effectively adjust the channel setting states of the respective channels in the channel setting information menu.

As described above, the present invention provides a television control method which not only allows the user to easily and simply recognize a channel setting state according to channels when the user wants to adjust channel-related functions, but also allows the user to conveniently and effectively adjust the channel setting state according to the channels.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling a display device comprising a user input part for manipulating a channel adjusting item, the method comprising:
　　displaying a channel map showing a predetermined number of channels including a current broadcast channel if the channel adjusting item is selected through the user input part, and a channel setting information menu corresponding to one of a plurality of channels shown in the channel map and comprising one or more settings adjustable through the user input part;

determining whether a predetermined period of time elapses in a state that a pointing highlight on the channel map is stopped at the channel in the case where the pointing highlight is moved on the channel map as the user input part is manipulated; and displaying the channel pointed by the pointing highlight if the predetermined period of time elapses in the state that the pointing highlight is stopped.

2. The method according to claim 1, wherein the channel setting information menu comprises:
- at least one of a channel name item to adjust a name of the channel;
- a channel add or erase item showing an add or erase state of the channel and adding or erasing the channel;
- a preference channel item showing whether the channel is set as a preference channel and setting the channel as the preference channel;
- a low noise amplifier item showing whether receive sensitivity is improved and setting the receive sensitivity; and
- a channel lock item showing whether a channel is locked and setting a channel lock function.

3. The method according to claim 2, wherein the user input part comprises a third key which is manipulated to select a pointed item,
the method further comprising adjusting a channel setting state of a pointed channel through the channel setting information menu corresponding to the pointed channel if the third key is manipulated.

4. The method according to claim 3, wherein the adjusting the channel setting state of the pointed channel comprises:
- displaying the pointing highlight on the channel setting information menu corresponding to the pointed channel if the selection key is manipulated;
- pointing a predetermined item by moving the pointing highlight on the channel setting information menu as the user input part is manipulated; and
- adjusting the channel setting state corresponding to the item pointed by the pointing highlight on the channel setting information menu as the user input part is manipulated.

5. A method of controlling a display device comprising a user input part for manipulating a channel adjusting item, the method comprising:
- selecting the channel adjusting item through the user input part;
- displaying a channel map showing a predetermined number of channels including a current broadcast channel and a channel setting information menu corresponding to a channel pointed to by a pointing highlight on the channel map;
- moving the pointing highlight on the channel map as the user input part is manipulated;
- determining whether a predetermined period of time elapses in a state in which the pointing highlight is stopped at the channel; and
- displaying the channel pointed to by the pointing highlight if the predetermined period of time elapses in the state in which the pointing highlight is stopped at the channel.

6. The method according to claim 5, wherein the channel setting information menu comprises:
- at least one of a channel name item to adjust a name of the channel;
- a channel add or erase item showing an add or erase state of the channel and adding or erasing the channel;
- a preference channel item showing whether the channel is set as a preference channel and setting the channel as the preference channel;
- a low noise amplifier item showing whether receive sensitivity is improved and setting the receive sensitivity; and
- a channel lock item showing whether a channel is locked and setting a channel lock function.

7. The method according to claim 6, wherein the user input part comprises a third key which is manipulated to select a pointed item,
the method further comprising adjusting a channel setting state of a pointed channel through the channel setting information menu corresponding to the pointed channel if the third key is manipulated.

8. A display device comprising:
- a display part to display a picture based on a received broadcast signal;
- a user input part to manipulate a channel adjusting item;
- a receiving part to receive a command for manipulating the channel adjusting item from a user input part;
- a controller to control the display part to display a channel map showing a predetermined number of channels and a channel setting information menu corresponding to one of a plurality of channels shown in the channel map and to determine whether a predetermined period of time elapses in a state that a pointing highlight on the channel map is stopped at the channel in the case where the pointing highlight is moved on the channel map as the user input part is manipulated; and
- a channel selection part to select a channel pointed by the pointing highlight on the channel map to be displayed on the display part, if the predetermined period of time elapses in the state that the pointing highlight is stopped,
wherein the controller comprising one or more settings adjustable through the user input part, if the command is received through the receiving part.

9. The display device according to claim 8, wherein the channel setting information menu comprises:
- at least one of a channel name item to adjust a name of the channel;
- a channel add or erase item showing an add or erase state of the channel and adding or erasing the channel;
- a preference channel item showing whether the channel is set as a preference channel and setting the channel as the preference channel;
- a low noise amplifier item showing whether receive sensitivity is improved and setting the receive sensitivity; and
- a channel lock item showing whether a channel is locked and setting a channel lock function.

10. A display device comprising:
- a display part to display a channel map showing a predetermined number of channels including a tuned broadcast channel and a channel setting information menu corresponding to a channel pointed to by a pointing highlight on the channel map;
- a user input part to select a channel adjusting item and to move the pointing highlight on the channel map;
- a controller to determine whether a predetermined period of time elapses in a state in which the pointing highlight is stopped at the channel; and
- a channel selection part to select the channel pointed to by the pointing highlight if the predetermined period of time elapses in the state in which the pointing highlight is stopped at the channel.

11. The display device according to claim 10, wherein the channel setting information menu comprises:

at least one of a channel name item to adjust a name of the channel;

a channel add or erase item showing an add or erase state of the channel and adding or erasing the channel;

a preference channel item showing whether the channel is set as a preference channel and setting the channel as the preference channel;

a low noise amplifier item showing whether receive sensitivity is improved and setting the receive sensitivity; and a channel lock item showing whether a channel is locked and setting a channel lock function.

\* \* \* \* \*